US011501005B2

(12) United States Patent
Lapworth

(10) Patent No.: US 11,501,005 B2
(45) Date of Patent: Nov. 15, 2022

(54) SECURITY SYSTEM FOR USING SHARED COMPUTATIONAL FACILITIES

(71) Applicant: ROLLS-ROYCE plc, London (GB)

(72) Inventor: Bryan L Lapworth, Derby (GB)

(73) Assignee: ROLLS-ROYCE plc, London (GB)

( * ) Notice: Subject to any disclaimer, the term of this patent is extended or adjusted under 35 U.S.C. 154(b) by 140 days.

(21) Appl. No.: 17/002,966

(22) Filed: Aug. 26, 2020

(65) Prior Publication Data

US 2021/0064765 A1 Mar. 4, 2021

(30) Foreign Application Priority Data

Sep. 3, 2019 (GB) ..................................... 1912629

(51) Int. Cl.
*G06F 21/60* (2013.01)
*G06F 9/48* (2006.01)
*G06F 21/78* (2013.01)
*H04L 9/08* (2006.01)
*H04L 9/14* (2006.01)

(52) U.S. Cl.
CPC .............. *G06F 21/602* (2013.01); *G06F 9/48* (2013.01); *G06F 21/78* (2013.01); *H04L 9/083* (2013.01); *H04L 9/14* (2013.01)

(58) Field of Classification Search
CPC .......... G06F 21/602; G06F 9/48; G06F 21/78; G06F 21/6218; G06F 21/64; G06F 21/74; H04L 9/083; H04L 9/14; H04L 9/0897; H04L 63/0428; H04L 63/062; H04L 9/0822; H04L 2209/127; H04L 2463/062; H04L 67/10; G09C 1/00
See application file for complete search history.

(56) References Cited

U.S. PATENT DOCUMENTS

| 2014/0281511 | A1* | 9/2014 | Kaushik | ................ | H04L 63/062 |
| | | | | | 713/164 |
| 2016/0283731 | A1* | 9/2016 | Chow | ................. | G06F 21/6263 |
| 2017/0223115 | A1* | 8/2017 | Childs | .................. | G06F 16/182 |
| 2019/0362083 | A1* | 11/2019 | Ortiz | ..................... | G06N 20/00 |

OTHER PUBLICATIONS

May 13, 2020 British Search Report issued in British Patent Application No. 1912629.1.
Jan. 21, 2021 Extended European Search Report issued in European Patent Application No. 20192847.0.

* cited by examiner

*Primary Examiner* — Abiy Getachew
(74) *Attorney, Agent, or Firm* — Oliff PLC

(57) ABSTRACT

A method and system for performing computational jobs securely on a shared computing resource. Data files for the computational job are encrypted on a secure system and the encrypted data files are stored in a data store on the shared computing resource. A key distribution server is established using a secure enclave on a front end of the shared computing resource. Cryptographic keys and application binaries are transferred to the enclave of the shared computing resource using a session key. The computational job is run using an application launcher on compute nodes of an untrusted execution environment of the shared computing resource, the application launcher obtaining the application binaries and the cryptographic keys from the key distribution server.

20 Claims, 8 Drawing Sheets

SECURITY SYSTEM FOR USING SHARED COMPUTATIONAL FACILITIES

BACKGROUND OF THE INVENTION

The present disclosure concerns a security system for allowing running of confidential computational jobs on shared or external hardware resources.

Many organisations need access to shared facilities to run computational jobs, for example to run computationally-expensive jobs without tying up its own in-house hardware, or else to run jobs efficiently on more powerful hardware than is currently available in-house. A significant driver for many organisations is the ability to access large scale leadership class supercomputers. However the security of the data and codes transmitted to run on external/shared hardware resources is a key concern.

Examples of such computational jobs comprises engineering, physics, chemical and biological simulations, amongst other modelling applications, e.g. for which equations need to be solved over a domain containing vast numbers (e.g. millions) of cells or unknowns/variables.

FIG. 1 shows a typical arrangement for an organisation's access to shared facilities. An approved user 1 of the organisation accesses a trusted system 2 within the organisation. Access to the shared system is through a trusted connection 3. Firewalls ensure that only outgoing connections can be established—no-one on the shared system, even a trusted user, can establish a reverse connection to the trusted system. The shared system 4 typically has externally facing systems such as logon nodes and pre and post processing nodes. Here, a node means a computer or server. For the purposes of this disclosure, such nodes are identified as the staging system 5.

Computational jobs are submitted to a queue to be run on the execution system 6. Both the staging and execution systems are shared across multiple users and are considered to be untrusted in terms of the security of data and codes. The staging 5 and execution 6 systems share one or more file storage systems where the data needed to run the job will be encrypted with a key known only to the organisational user. A further feature of the shared system is that the execution system 6 is typically behind a firewall which prevents external access, e.g. to the internet.

It is a further problem that data files and/or application binaries need to be provided to the untrusted/shared resource in advance. For example, there may exist a queuing system on the system 4 such that any job submitted to the resource may need to wait for its allotted time for execution, i.e. when sufficient resource becomes available and/or when preceding jobs have been completed. This may mean that sensitive data needs to be stored for an indefinite period of hours, days or weeks on an untrusted system, thereby causing the data to be exposed.

The uncertain delay also means that human intervention cannot be relied upon to coordinate the running of the job at launch time. This means that established techniques such as RSA-based key fobs and mobile phone based user authentication techniques cannot be used to establish trust when the job launches. Further, the execution system 6 is prevented from accessing a certificate authority to provide a root of trust, such as that used in Public Key Infrastructure, because it has no access to the internet.

An example of existing technology for managing the running of sensitive jobs on external hardware is Intel® Software Guard Extensions (SGX). SGX comprise a set of instructions that increases the security of application code and data to provide protection from disclosure or modification. Developers can partition sensitive information into enclaves, which are areas of execution in memory with greater security protection. Enclaves have integrity-added protections to help prevent access from processes at higher privilege levels.

FIG. 2 shows a schematic of the SGX programming model. A SGX application consists of two parts: (a) a secure part that runs within the enclave; and, (b) an insecure part that runs in the open. Data is passed to and from the enclave using a secure interface.

The term 'untrusted' refers to code or construct that runs in the application environment outside the enclave. The term 'trusted' refers to code or construct that runs in the Trusted Execution Environment inside the enclave.

An ECALL is a call from the application into an interface function within the enclave, whereas an OCALL is a call made from within the enclave to the application.

An untrusted Run-Time System (uRTS) refers to code that executes outside the enclave environment and performs functions such as:

Loading and manipulating an enclave (e.g. destroying an enclave).

Making ECALLs to an enclave and receiving OCALLs from an enclave.

A trusted Run-Time System (tRTS) refers to code that executes within the enclave environment and performs functions such as:

Receiving ECALLs from the application and making OCALLs.

Managing the enclave itself.

ISV is independent software running inside the enclave.

FIG. 2 demonstrates the interface between trusted and untrusted components, i.e. the trust boundary, of a conventional system. A key element of the SGX model is that access to the enclave is through an application that is running in the open.

It is an aim of the disclosure to provide a trust model and system that can prevent access to the data and code that needs to be transmitted to run jobs on shared resources and that is secure against attacks, e.g. by rogue users and rogue administrators. It may be considered an additional/alternative aim to provide a system that is robust against a rogue administrator, e.g. who can impersonate any genuine user including the organisational user.

BRIEF SUMMARY OF THE INVENTION

This disclosure derives from the need to protect data and codes on shared systems where there is limited scope for human-in-the-loop verification and there is no access to external certificate authorities. The system and method disclosed herein is built up by starting with a minimal trust boundary and then adding measures that allow more actors and actions to be brought within the trust boundary.

The trust model/system of the present disclosure may prevent the administrator decrypting the data, e.g. requiring that this can only be done by returning the data to the originating organisation's trusted system According to a first aspect of the present disclosure there is provided a method of performing computational jobs on shared computing resource, comprising: encrypting data files for a computational job on a secure system and storing the encrypted data files in a shared data store on the shared computing resource; establishing a key distribution server using a secure enclave on a front end of the shared computing resource; transferring cryptographic keys and application binaries to the enclave of the shared computing resources using a session key; the key distribution server providing access to the data files of the shared data store via the cryptographic keys and application binaries for the computational job to compute nodes of an execution environment of the shared computing resources at run time using an application launcher, said application launcher obtaining the application binaries and the cryptographic keys from the key distribution server.

Authentication meta data may also be transmitted with the cryptographic keys and application binaries.

The method may comprise authenticating the application at run time, e.g. without recourse to an external certificate authority or human-in-the-loop verification.

The application binaries may not/never be at rest on the shared computing resource, e.g. in a (non-volatile) data store of the shared computing resource.

The data file cryptographic key may be obtained at run-time via a key client. A call back routine/module of the key client may be operable at run time.

An embedded key client may be provided on the compute nodes.

The front end of the shared computing resource may comprise an untrusted staging area of the shared computing resource. The execution environment may comprise an untrusted execution environment.

Cryptographic keys may be transferred between the front end and execution environment of the shared computing resource over a trusted connection.

Session keys may be used may be used for any/all communication/transfer of data files, application binaries and/or data cryptographic keys. No sensitive data may be sent in the clear.

The application binary may be obtained at run time over an existing/trusted connection. The application binary may be encrypted in transit using a symmetric session key.

The application binary may (only) be loaded into anonymous RAM and/or may be sealed to prevent tampering.

The compute nodes of the execution environment may be prevented from communication with the front end by one or more policy. The front end and execution environment of the shared computing resource may be separated by a firewall.

An application launcher may be used to load one or more libraries needed/used by the application binary. The application may be compiled as a dynamic library.

The libraries may also not/never be at rest on the shared computing resource and held securely in the key distribution server's data store.

The application launcher may be a rest on the shared computing resource but the app launcher may not be sensitive.

Obfuscation may be used, e.g. to prevent keys being extracted from the application launcher's run-time memory and/or the application binary.

The application launcher may comprise the key client and/or key call back routine/module. This may ensure that the cryptographic key never leaves a secure memory of the application launcher.

Verification of the application binaries may be performed, e.g. at run time. The key client may perform one or more verifications, e.g. to ensure the code has not been tampered with. Attestation (signing) and/or checksum verification may be used. Any verification may be implemented by/for the application launcher.

Core dumps from the compute nodes may be prevented by the application binary or application launcher. A core dump limit may be set to zero or a sufficiently low threshold. This or other measures may be implemented to prevent sensitive data being paged to disk on the shared computational resource.

The application binaries/libraries may comprise any, any combination or all of a core solver, middleware, a cryptographic interface and/or third-party cryptographic library.

Each compute node may comprise a key client and/or may implement a key call back routine.

A first compute node may communicate with the key distribution server. Session keys may be exchanged between the first compute node and other/remaining compute nodes of the execution environment, e.g. at run time.

The computational job(s) may be launched by a user from the trusted system.

Any/all input and output data at rest on the shared resource may be encrypted.

The enclave may be implemented using Intel® SGX (Security Guard Extensions) hardware technology.

Data held in a secure enclave may comprise cryptographic translation (encryption and decryption) keys and application/run-time binaries, e.g. for the solver, and any required libraries.

User IDs on the shared computing resource may be validated by cryptographic/RSA keys or hashed passwords.

According to a second aspect, there is provided a shared computational system arranged to perform computational jobs instigated by a trusted system according to the method of the first aspect.

The method or system may ensure that other users or system administrators cannot access either the cryptographic key or unencrypted copies of the data files.

According to a third aspect of the present disclosure, there is provided a data carrier or data storage medium comprising machine readable instructions for one or more processor of the shared computational system to operate in accordance with the first aspect.

According to a fourth aspect of the invention, there is provided an application launcher for a shared computational facility corresponding to the first or second aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

Embodiments will now be described by way of example only, with reference to the Figures, in which.

DETAILED DESCRIPTION

The system and method described herein has been developed to accommodate scenarios in which (a) the system admins are trusted, and (b) there is at least one rogue system admin being used. In both scenarios, other users of the system are untrusted. The trust models described hereinbelow will be built up step by step. Firstly, the process and model for trusted administrator accounts will be built, followed by a discussion of how the resulting system and elements of the trust model are resilient to untrusted admins.

Figure 1:
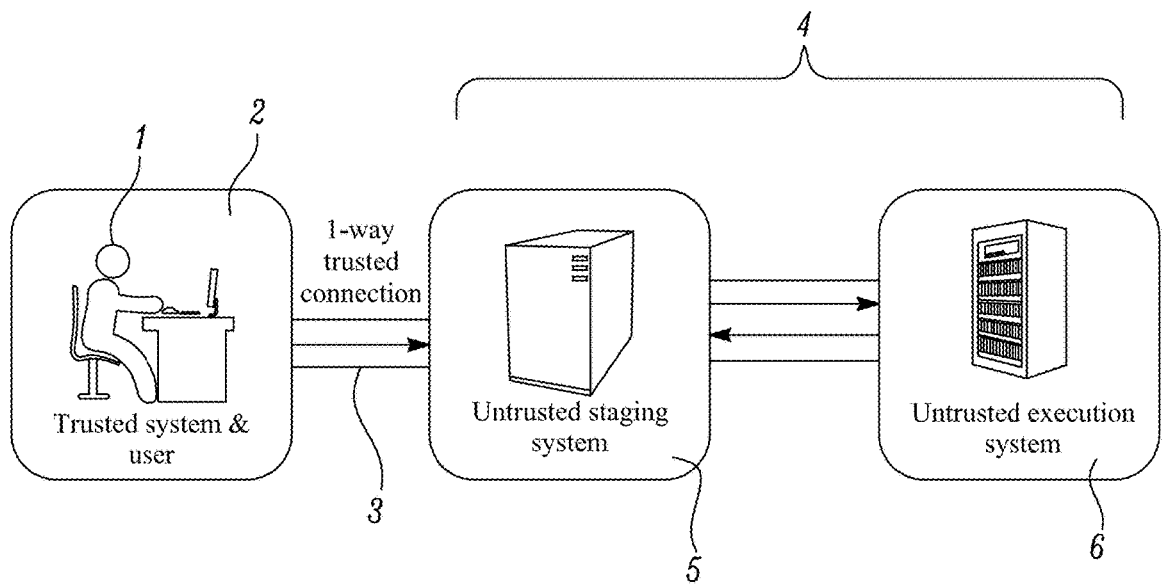
FIG. 1 shows the three physical systems for running computational jobs on a shared resource according to the prior art.
Figure 2:
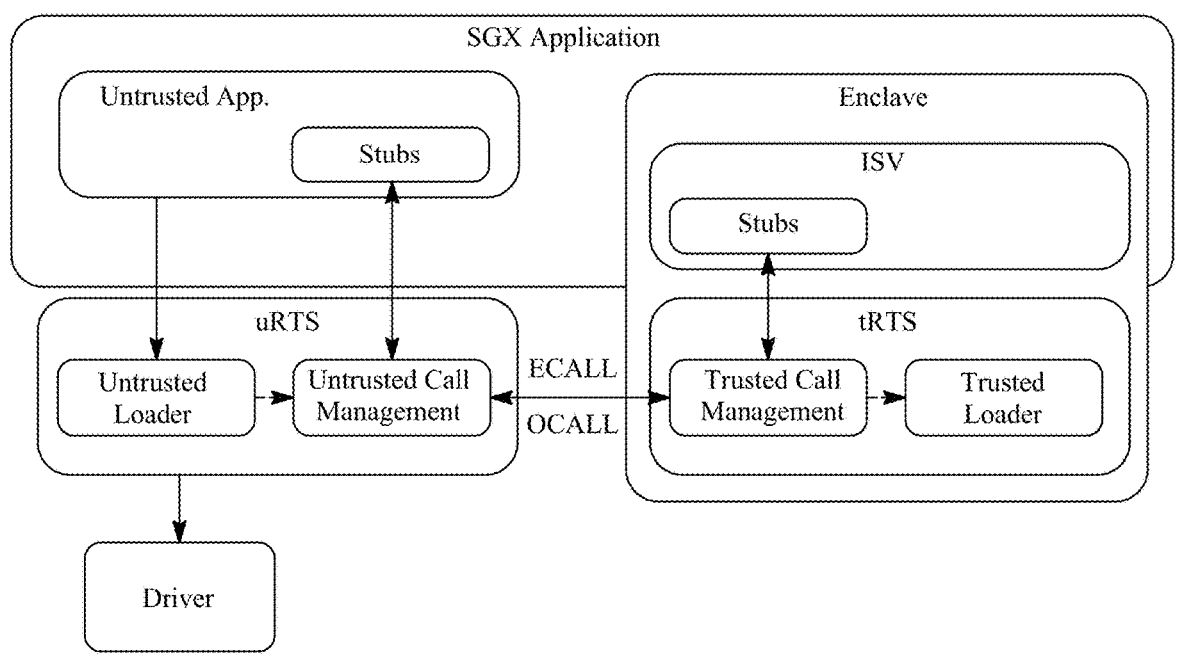
FIG. 2 is a schematic of how an application makes use of Intel® SGX (Security Guard Extensions) hardware technology according to the prior art.

The systems affected by the security model are shown in FIG. 1. A trusted user 1 and system 2 sit within an organisation or at trusted site. Access to the shared system is through a trusted connection 3. Firewalls ensure that only outgoing connections can be established. The shared system 4 has two components: a staging system 5 which typically consists of logon nodes, and pre and post processing nodes; and, an execution system 6 consisting of a (e.g. large) number of compute nodes. The staging and execution systems share one or more file storage systems; and, there is typically a firewall between the staging and execution systems which prevents the latter having external access, e.g. to the internet.

Figure 3:
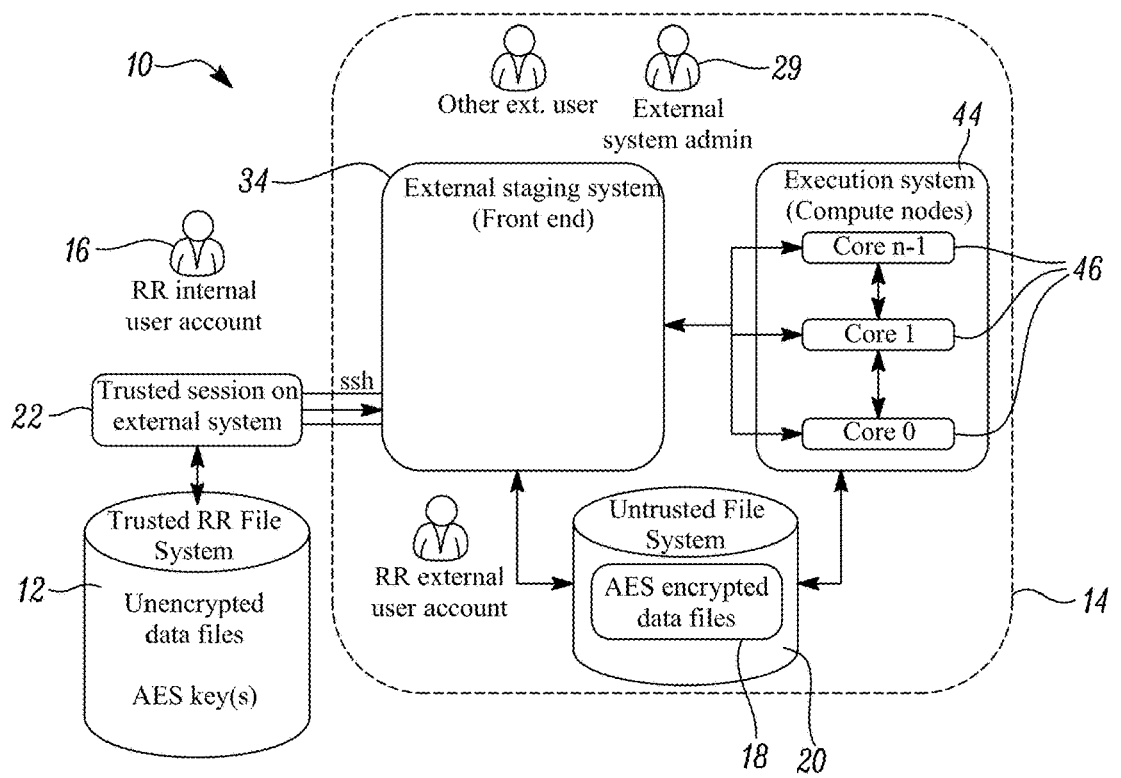
FIG. 3 is a schematic of an overall security system according to this disclosure for executing simulation codes on external systems in an initial trust condition.

The security model is shown in FIG. 3, which comprises a schematic of the overall system 10 at an initial condition. The model involves a trusted internal file system 12 which could comprise a trusted site and associated hardware, e.g. owned by the organisation sending the computational job to the external system 14, or else one or more trusted areas of an external system. The system 12 could be either physically inside premises owned/controlled by the organisation or an approved system than is virtually inside its perimeter.

The external system 14 comprises a front end 34, an untrusted data store (e.g. a file system) 20 and an execution system 44 comprising multiple compute nodes 46.

The initial condition is that the internal file system 12 is trusted, e.g. comprising unencrypted or encrypted data files in a non-volatile data store. An internal user account 16 is also trusted. Encrypted data files 18 can be transferred onto the untrusted file system (i.e. data store) 20 of the external system 14 in a conventional manner. As such the only trusted elements of the system in the initial condition are the in-house file system 12, the encrypted data files 18 and the internal user account 16. The user account may permit initiation of a trusted session on the external system at 22 using conventional means, such as a secure login procedure or the like.

The external systems 14 have varying levels of security, e.g. assurances of the security of information stored thereon. That is to say such systems may be approved or trusted for data storage, e.g. including trusting of the external system administrators 24, but such approval does not typically extend to running of computational jobs since this would involve further considerations.

Figure 4:
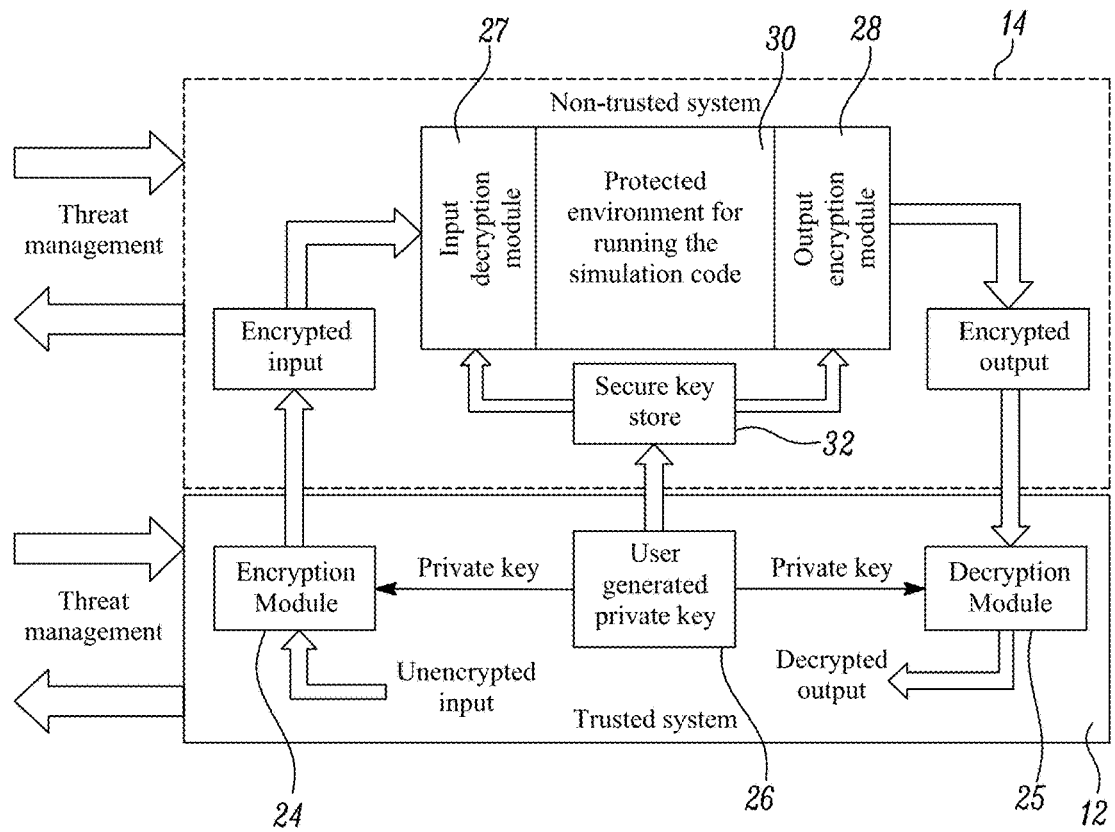
FIG. 4 shows a schematic of secure data flow for the overall system.

Turning to FIG. 4, there is shown an overall model for the data flow using the system 10. The system 10 involves cryptographic translation (i.e. encryption and decryption) modules 24, 25 and a private key generation module 26 on the secure/in-house system 12. Respective cryptographic translation modules 27, 28 are provided on the external system 14 (i.e. decryption 27 and encryption 28 modules for the respective data input and output of the application code 30 running on the external system 14 hardware). A secure key store 32 is also provided on the external system 14, from which the keys generated by the module 26 can be stored and accessed for the use by modules 27, 28.

Thus files encrypted at 24 by the trusted system 12 are transmitted for decryption at 27 on the external system 14 and processing by the application software 30, prior to the output being re-encrypted at 28 for transmission back to the trusted system 12 and decrypted again at 25.

In the examples given herein, the application software 30 comprises a solver, e.g. code for running a model/simulation of a scenario for given input/boundary conditions so as to generate a resulting data set representing an output of the simulation/model. The input data may comprise geometric data representing a discretised domain to be modelled and/or a set of initial conditions for running the model.

The software application 30 comprises a set of algorithms operating to generate changes in the initial conditions throughout the discretised domain as part of the modelling process. The output comprises the resulting values for each discrete portion of the domain as a result of the modelling process. As such the input/output data may comprise geometric data (e.g. mesh data) defining discrete portions or locations (i.e. cells) of a physical domain and parameter values associated with each portion/location.

However it is to be understood that engineering, physics-based and/or chemical modelling of domains represents just a few examples of possible solvers for which the model described herein may be used. In general, the trust model described herein is relevant to situations in which each of the input data, the solver code itself, and the output data is sensitive and must be kept confidential. In the example of engineering simulation tools, the geometry data may be representative of confidential component, subassembly or system geometry. The solver itself may represent proprietary code. The output may represent a response of an engineering component, subassembly or system to operational conditions.

There are five main underlying elements to the trust model described herein:

a) Data sent to or generated on the external system 14 is always encrypted. Data is encrypted and decrypted on the fly, e.g. in transient/volatile memory, by the solver 30 so that no unencrypted data is at rest, e.g. in non-volatile memory, on the external system 14.

b) The private key needed to decrypt the input data at run-time, i.e. at module 27, is held securely in the store 32 on the external system 14.

c) The solver/simulation code 30 executes in a protected environment with approved threat management and counter measures.

d) The protected environment for running the solver utilises a, so-called, app launcher which obtains the binary code for the solver from the secure key store. The app launcher is the only application software that is at rest on the external system. The app launcher has two modes of operation: registration mode used to establish initial trust; and run mode where trust is reasserted and the solver binary is run on the system. It is only in registration mode that human verification is needed.

e) In run mode, the app launcher attests its authenticity to the server, before it is given access to secure data and codes, without the need for a human-in-the-loop or access to a third party verification system.

Threat management and/or counter-measures in various examples may comprise:

Recruitment policies for system administrators 29, e.g. screening/security checks such as Baseline Personnel Security Standard and/or Security Clearance vetting.

Access policies, e.g. controlling or preventing system administrators 29 from remote login.

Intrusion detection including alerting systems and regularly, at least daily, reviews of access logs.

Independent threat management provisions for the in-house 12 and external 14 systems may be implemented provided they both meet relevant standards.

Figure 5:
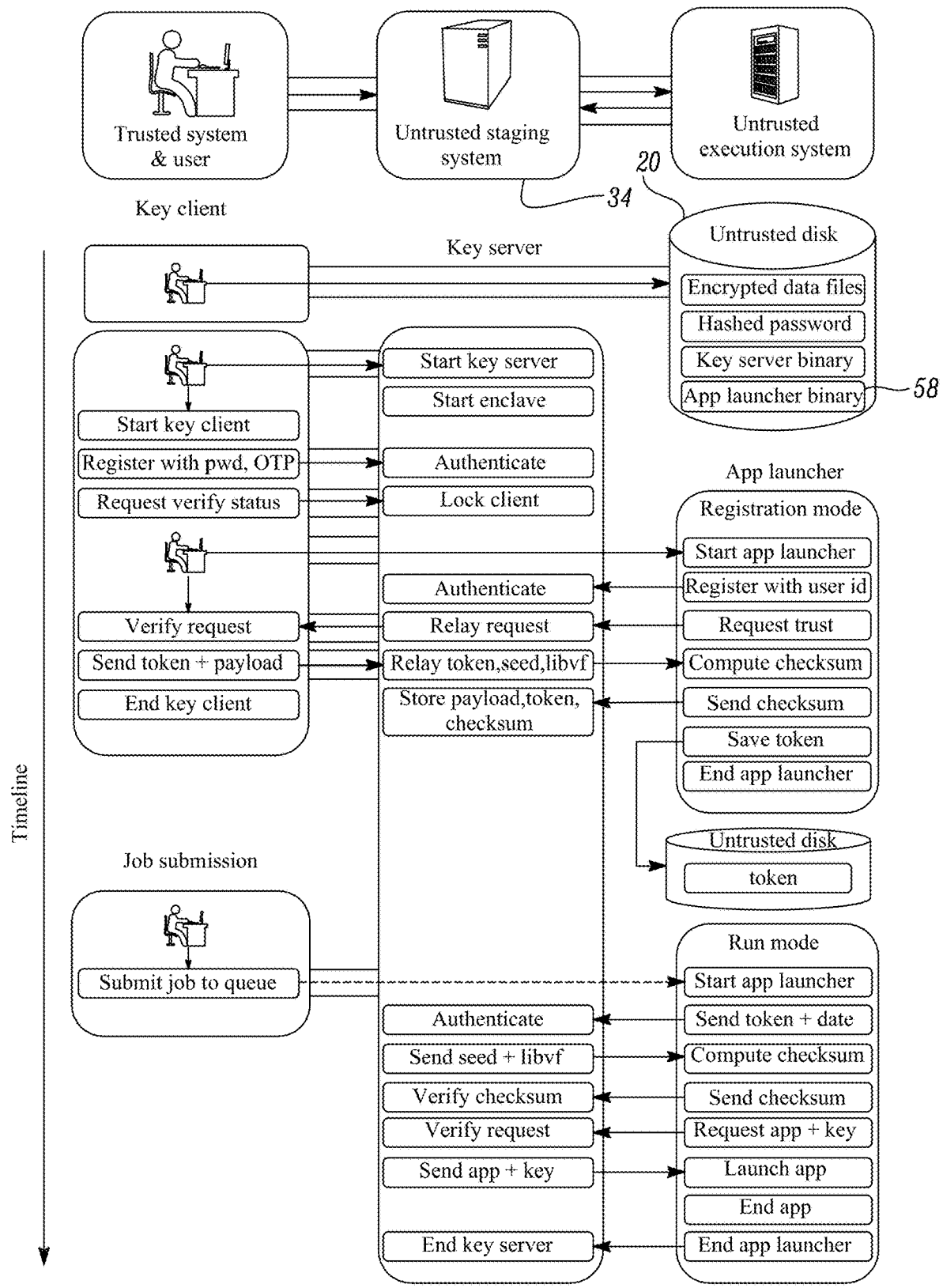
FIG. 5 shows the overall process flow from initial distribution of the data to the completion of the application.
Figure 7:
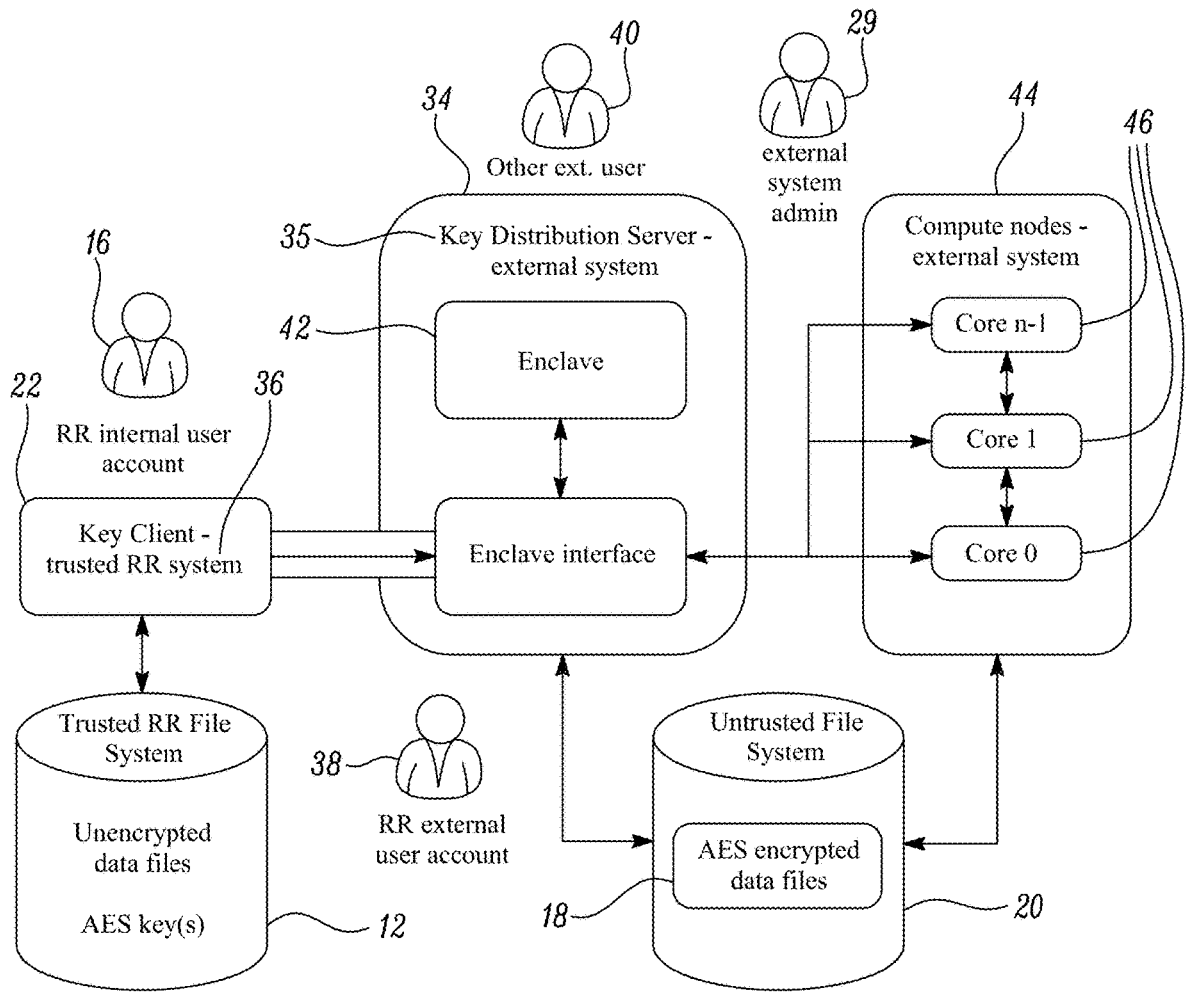
FIG. 7 shows a trust position of the system after establishing trust in the key distribution server.

The security model in FIGS. 3 and 4 provides for the following general sequence of operation, as can be seen with reference to FIGS. 5 and 7. All actions taken by a trusted internal user 16 accessing the external system may be via a secure channel (e.g. Secure Shell (SSH) protocol or other similar protocols).

1. On the trusted system, input/solver data files are encrypted using a symmetric data encryption key; the user creates a password for later access to the server and saves a hash of the password; and, obtains or builds the app launcher binary for the execution system. These are not shown in FIGS. 3 and 4.

2. The encrypted data files, hashed password file, and the binary files for the key distribution server and app launcher are securely copied, using e.g. secure copy (scp) or secure file transfer (sftp) protocol to the external file system 14 where they may remain at rest for an extended period. Although the data files are encrypted, they should be placed in a non-backed-up area of the external file system 14. The hashed password file is stored in a location that is only accessible by the user.

3. Launch a key distribution server 35 on the external staging system, e.g. at the front end 34 of the external system 14. This may be a transit area and may be initially stateless, i.e. it has no keys. The only requirement is that the key distribution server has access to the hashed password file. The key distribution server creates, e.g. immediately, a secure enclave 42 (shown in FIG. 7). This may be done using Intel SGX technology.

4. Launch a key client 36 on the trusted internal system, for example using the IP address and port supplied by the internal/trusted user 16 to locate and connect to the server. The key client authenticates itself with the server using 2-factor authentication consisting of the password and a time-bound one-time passcode generated by the server. Any other means of 2-factor authentication, or a suitable alternative, may be used. The server may refuse connections if the access permissions to the hashed password file are insecure. The server may log all connection attempts and close down after a certain number of failed attempts. The server and client create a shared cryptographic session key for all future data exchanges.

5. Once authenticated, the key client requests verifier status from the server. At this point, the server may lock the client, preventing the key client from making any other requests to the key distribution server. The key client remains locked until the server receives a verification request from the app launcher.

6. The trusted user now launches the app launcher 58 in registration mode on the untrusted execution system. The app launcher 58 makes an initial connection request using just a userid—this does not establish trust but is a minimum before setting up a shared cryptographic session key. The app launcher 58 must request trusted status by sending the identifier of the verifier client and the app launcher's working directory. No password is entered on the external system.

7. The key distribution server 35 forwards the verification request to the key client that the app launcher 58 has identified along with the working directory submitted in step 6 and the app launcher's identifier.

8. The key client 36 prompts the trusted user to either grant or deny the verification request. The user may send a kill signal to the server if he/she thinks the system has been compromised.

9. If the verification is granted. The key client 36 sends a payload to the server consisting of: a randomly generated token, a so-called verification library; the cryptographic key used to encrypt the data files; the application binary; and, the binaries of any dependent libraries needed by the app. The payload is encrypted by the shared cryptographic session key. The key distribution server 35 decrypts the payload directly into its secure enclave 42.

10. The key client may now be shut-down as the trust model requires no further human intervention.

11. The key distribution server 35 forwards an encrypted payload to the app launcher 58 consisting of: the verification token, a randomly generated seed; and, the verification library.

12. The app launcher 58 may use the seed and a checksum routine within the verification library to calculate a unique trace of the memory footprint of the app launcher. Any other verification function that creates a unique trace may be used as long as it can detect tampering with the binary. The trace (checksum) is hashed and returned to the key distribution server 35 to be stored in the latter's secure enclave 42.

13. The app launcher 58 stores the token in its current directory with access permissions restricted to the user. It sends the date stamp of the token file to the key distribution server. Registration is now complete and the app launcher may terminate.

14. The trusted user accesses the staging area and submits a job to the queue. The job may sit in the queue for some before it begins to run. The job must be submitted from the same directory as previously used to register the app launcher. The job submission contains the binary for the app launcher 58 and the server's IP address and port. No other information about the job is needed.

15. When the app launcher starts it is in run mode. For initial verification it reads the token from the token file and sends the token; the date stamp of the token file; and, the working directory to the server. These must all match the values stored in the key distribution server's secure enclave 42 established during registration mode. Not shown in FIG. 5 is the initial userid verification used to establish shared cryptographic session keys. This is identical to the initial verification in step 6.

16. The app launcher 58 again receives the verification library and computes the checksum (trace) as described in step 11 and sends this to the server. This must match the value stored in the key distribution server's secure enclave 42 established during registration mode.

17. If steps 15 and 16 have been successful, the app launcher 58 may request and receive the app binary and the data encryption key from the server.
18. The app binary and any required libraries may be loaded into secure memory and executed from there. Anonymous memory may also be used. The app binary is never at rest on the external system.
19. Once the app starts running it needs the encryption key to decrypt the input data. Access to the data encryption key by the app is controlled by the app launcher 58 and may use the verification library which is also never at rest on the external system. For large parallel computations each parallel process or thread needs access to the key. Each process may request the key from the key distribution server 35. Alternatively, one process may request the key and share it with the other processes. The app launcher may distribute the data encryption key to all the processes that need it. In this case the app launcher may send a kill signal to the server.
20. When the job is complete, the app launcher may send a kill signal to the server.

As will be discussed the data encryption key will be shared using session keys to ensure that the data key is never sent in the clear.

The data files 18 may be encrypted using approved algorithms, e.g. AES (Advanced Encryption Standard) algorithm as approved by NIST and are not consider vulnerable, at least for the purposes of the trust model. Taking the above sequence of operation, there are two types of vulnerabilities.

The first potential vulnerability is persistent processes and files whose lifetime is governed by the time the job takes to queue and run. These are:
The key distribution server 35.
The executables for the key distribution server and the app launcher.
The hashed password and verification token used by the key client and app launcher to prove their authenticity.

The second type of potential vulnerability comprise the actors:
The user account 38 on the external system, e.g. for which an attacker may have discovered the password or otherwise gained access.
Other users 40 of the external system.
The system administrator(s) 29.

In the following description relating to the figures, elements coloured green are trusted within the model and other shades are untrusted.

The initial trust position of FIG. 3 described above, i.e. only system 12, user 16 and the encrypted data 18 on the external file system 20 are trusted, covers steps 1 and 2 in the sequence described above.

The next step in the sequence (i.e. step 3) is launching the key distribution server on the external system.

Trusting the Key Distribution Server

The role of the key distribution server 35 is to pass the data encryption key securely from the trusted/internal system 12 to the simulation job.

In the examples described herein a trusted enclave 42 is established/created on the external system 14. The key distribution server in this example is built using the SGX technology described above, e.g. because it allows creation of the trusted enclave 42.

However, there is also an untrusted application wrapper that must be considered first, referred to herein as the key distribution (kd) server 35 application, and an associated enclave library. The user has to launch a kd-server on the front end 34 of the external system 14. Implementation of the enclave/SGX model means that, while this kd-server application is untrusted, it cannot access essential enclave properties such as hardware generated private keys.

The kd-server 35 is essentially a Man-in-the-Middle (MITM). It can be prevented from performing MITM attacks by the use of session keys (e.g. Diffie-Hellman) generated in the enclave. The client can independently verify and then trust the enclave 42 without trusting the kd-server application on the front end 34 of the external system 14.

A threat to consider is the authenticity of the binaries for kd-server 35 and the associated enclave 42. These are likely to be at rest on the external system 14 and, as such, there is a risk that an attacker substitutes one or both of the binaries.

Figure 6:
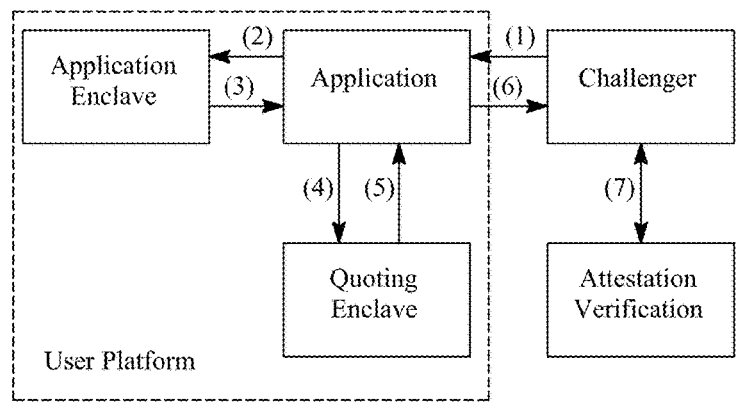
FIG. 6 shows an example of a remote attestation example scenario.

Consider, first, the enclave 42 binary. SGX allows the enclave to be signed such that once it has been signed, any modifications to the enclave binary can be detected. The signing process allows the enclave to attest itself to the client 36, which runs on the trusted/internal system 12. This is illustrated in FIG. 6, where the attestation verification is provided, for example, by the Intel Attestation Service (IAS). The attestation process includes the generation of a shared Diffie-Hellman session key that only the enclave and client (i.e. the challenger in FIG. 6) can use to decrypt messages sent between them.

FIG. 6 shows a remote attestation example, in which the challenger is off-platform with respect to the attester.

The threat is not that the enclave isn't genuine but that it is an attacker's enclave, as the IAS just sees a new verification request from a genuine platform. This can be defeated by sealing the enclave 42 using an RSA key pair generated on the client 22. The client's public RSA key provides the sealing identity. Since the public key is not a secret it can be provided at build time to the enclave 42. This means that the client's private key has to have some longevity. Hence, an attacker is only able to frustrate the key distribution; but, since this stage of the operation requires the user to be at the terminal, it will be quickly discovered.

Considering the kd-server 35 binary, all messages passing through the server are encrypted with the session key and hence a compromised kd-server could not discover any confidential information, and instead it can only be used by an attacker to frustrate usage of the system. Again, this would be quickly discovered by a genuine user who is in attendance. The basis of the trust model is that the trusted user is in attendance when the kd-server, key client and app launcher (in registration mode) are launched. The user can trust that the kd-server 35 is the one that he/she has launched. The vulnerability is that the kd-server binary has been compromised.

Remote Invocation of the Key Distribution Server

If the integrity of the kd-server 35 binary is questionable, then a further defence would be to launch the server using a binary stored on the client 22. This can be done with ssh using a command of the form issued on the client:

ssh user@remotehost run.sh</local_path/kd-server

The run script has to ensure all the paths and environment variables are correctly set-up to run the kd-server binary. Note that the run script is at rest on the external system 14 but contains only non-sensitive information.

Based on the discussion in the preceding section, there is no need to provision the enclave binary from the client. There is also no real need to provision the kd-server binary from the client.

Trusting the Key Distribution Client

The key distribution client (kd-client) provides the root of trust for system. Trusting the client 36 is much easier than the server 35, since this runs entirely on the trusted/internal system 12 and is launched by the user 16. The server is identified by its IP address and port that the user 16 provides when the client 36 is launched. The enclave attestation process described above also generates a symmetric session key that can be used to send data to the enclave 42. This leads to the trust position shown in FIG. 7, i.e. after establishing trust in the key distribution server. The symmetric session key is generated following the exchange of public keys between the server and client. Each public private key pair is ephemeral and randomly generated using an industry standard library or hardware random number generator to generate cryptographically secure random numbers.

Given the longevity of the kd-server 35, it must protect itself against connection requests from spoof kd-clients. The kd-server may use a 2-factor authentication approach. The first factor is a password for which a hash on the password is stored on the staging system. The password is generated and hashed using an industry standard algorithm on the trusted platform. The hashing prevents reverse engineering of the password. The server may also ensure that the directory and password file can only be accessed by the user. The second factor is a time-bound one-time passcode (TOTP) generated by the kd-server 35. Since the kd-server has been launched via a secure connection from the trusted client the TOTP is only visible to the trusted user. The kd-server may ensure that its output is directed to the screen and has not been re-directed to a file on the untrusted staging system.

This completes steps 3 and 4 in the sequence of operations described above.

Step 5 is completed by the kd-client 36 declaring to the kd-server 35 that it is ready to act as a verifier to authenticate connection requests from the app launcher 58. At this point the kd-server locks any further communication with the kd-client until it has received a verification request from the app-launcher 58. This means the kd-server 35 can only relay verification requests to a waiting kd-client 36. The kd-server cannot initiate a verification request.

Trusting the App Launcher in Registration Mode

There are two stages to trusting the app launcher 58. The first is the registration stage. There is an initial authentication needed to allow the app launcher and the kd-server 35 to generate a shared cryptographic session key. This is based solely on the userid of the person that invocated the app launcher 58 and must be the same as that of the app launcher. This is vulnerable to spoofing but an attacker only discovers the kd-server's public key. To establish trust the app launcher must identify the kd-client that is acting as the verifier and send the working directory in which the app-launcher is running. The app-launcher may enforce that these must be entered at run-time by the trusted user and not stored in a file.

The client ID is dynamically allocated when the kd-client is launched—it is known only to the trusted user and kd-server 35 which stores it in its enclave 42. The kd-server relays the app-launcher's ID and the working directory to the kd-client acting as verifier. The trusted user is given the ID of the app-launcher 58 and the directory from which it was launched as attestation data. The trusted user may accept or decline the verification request. The trusted user may also choose to terminate the kd-server if an attack is suspected. This completes steps 6-8. If the verification requested is declined, no further steps are performed.

Step 9 is completed by the kd-client sending an encrypted payload to the kd-server. The payload contains: a randomly generated token; the binary of a verification library; the data encryption key; the application binary; and, any libraries needed to execute the app. These will be used in subsequent steps. At this point, no further human intervention is needed as part of the security model.

The trusted user must submit the computational job to the queue once the app launcher registration steps have been completed.

Step 10 is completed by the trusted user shutting down the kd-client.

Step 11 is completed by the kd-server decrypting and unpacking the payload into its secure enclave 42. The kd-server sends the token, a randomly generated seed and the verification library to the app-launcher 58. The app-launcher has been held in a waiting state and only the app launcher that requested the verification is able to receive the token, seed and library from the server. The token may be any recognised form of certification such as a X.509 certificate or the private key of a public key pair.

Step 12 is completed by the app-launcher 58 loading the verification library and using the seed to compute a trace of its memory footprint. The trace or checksum is hashed and returned to the kd-server to be stored in its enclave 42.

Step 13 is completed by the app-launcher storing the token in its working directory. The timestamp of the token file is returned to the kd-server to be stored in its enclave 42. This completes the registration of the app-launcher. All the information needed to re-authenticate the app launcher in run mode is held in the server's secure enclave 42 with only the token file stored on the untrusted file system 20. The app launcher ensures that (Unix) access permissions to the token file are restricted to the trusted user's account on the external system. This affords the same protection as a X.509 certificate or a RSA private key, such as that used in the ssh protocol.

The compute nodes 46 in FIGS. 3 and 7 often run a stripped down version of the operating system designed to give maximum performance. Some services available on the front end 34 are not available on the compute nodes 46, along with internet access to external sites. This means that certificate authorities such as the IAS and X.509 authorities are inaccessible. By trusting Unix access permissions, the user can generate a key/certificate pair and store both the public and private parts, e.g. in the .ssh directory. This obviates the need to contact a certificate authority.

Trusting the Job Submission

Step 14 is complete when the trusted user has submitted the computational job to the execution queue via a secure connection to the external system. This connection may be to a different node on the system from that used for the kd-server. The job information includes the location of the app launcher 58 binary, the kd-server's IP address and port; and, the working directory which must be the same as that used to register the app-launcher. This is information that must be submitted in the clear via a job submission script and, hence, is discoverable by an attacker.

The job request may sit in the queue for some minutes all the way to up some days and maybe over a week. When the job does launch, the server must verify that the app launcher has not been tampered with. An attacker may also have submitted a separate job with the same job information but a different binary or a compromised binary. The use of a token protected by access privileges and a stored working directory mean that only an attacker with elevated privileges is able to perform such an attack, as with other industry standard methods such as X.509 certificates.

Trusting the App Launcher in Run Mode

The app launcher 58 is started in run mode when the job starts to run. For initial verification it reads the token from the token file and sends the token; the date stamp of the token file; and, the working directory to the server. These must all match the values stored in the key distribution server's secure enclave 42 established during registration mode. At this point an attacker with elevated privileges may have tampered with the app launcher binary and have access to the working directory. Step 15 is completed by the kd-server 35 sending the previously generated seed and verification library to the app-launcher.

Step 16 consists of the app-launcher repeating step 12. The hashed checksum that is returned to the kd-server must match the hash previously generated in step 12. This ensures that the app-launcher has not been tampered with. The checksum also detects whether any of the shared object libraries that the app launcher loads have been changed. This prevents an indirect attack where an attacker changes one of the dependent libraries. An attacker does not have access to the verification library as this is not at rest on the external system.

Figure 8:
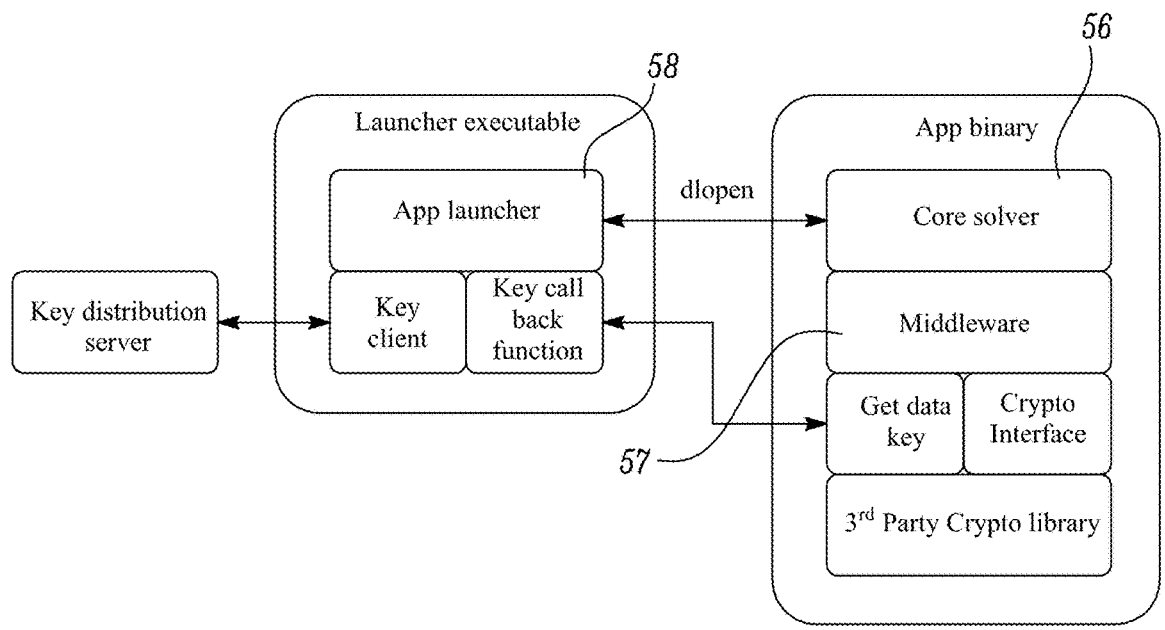
FIG. 8 shows the use of call-back technology to ensure access to the encryption key is controlled by an application launcher.
Figure 9:
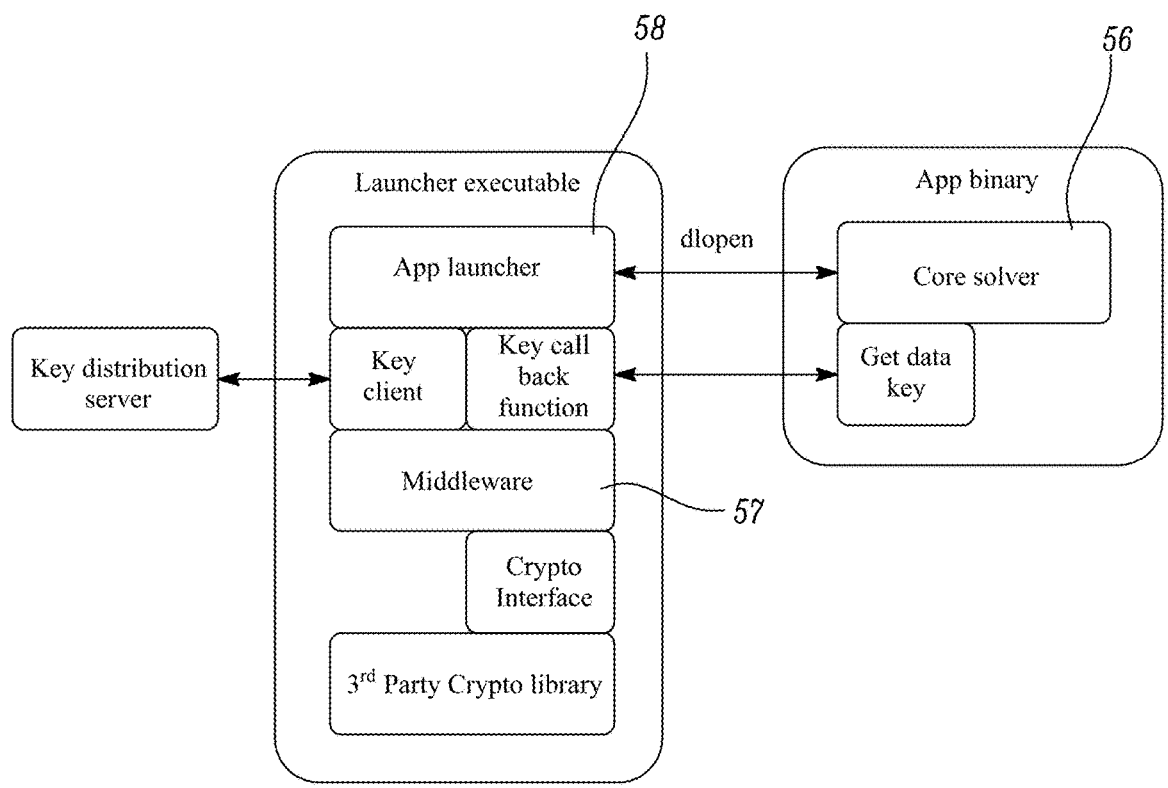
FIG. 9 shows an alternative use of call-back technology to ensure access to the encryption key is controlled by an application launcher.

FIG. 8 shows the dependency of the app binary 56 on so-called middleware libraries 57. These may be in-house developed libraries which can be shared securely in the same way as the app binary 56; or, system libraries which may be open to compromise or legitimate updates by a sys admin. FIG. 9 shows an alternative dependency model where the middleware libraries are included with app launcher. The app launcher 58 may be built as a static application to prevent tampering with the middleware libraries 57. Any hybrid of FIGS. 8 and 9 may be adopted with some middleware libraries included with the app launcher and others with the app binary.

The trust model ensures an attacker with no elevated privileges fails one of the verification tests. An attacker with elevated privileges can impersonate the trusted user's account on the external system but can only run the app-launcher as if they were the trusted user.

Step 17 is completed by the app launcher 58 requesting the data encryption key, the app binary 56 and any dependent libraries from the kd-server 35. The app launcher may store these in it its own secure enclave if this technology is available on the execution system. Alternatively, the app-launcher may use locked memory technology to prevent these items being cached to the file system and/or to prevent them being written to disk as part of a core dump. Obfuscation technology may be used to prevent attackers extracting sensitive data from the run-time stack.

The core dump vulnerability is that an attacker could force the code to produce a core dump which would contain details of the software and the state of the program at the time of the dump. Depending on how the data encryption key is handled and the timing of the core dump, it may contain the key. To counter this, on Unix systems, a setrlimit function can be used to set the RLIMIT_CORE resource to zero, which will prevent the operating system from leaving behind a core file.

The app launcher 58 may send a kill signal to the kd-server 35 at the end of this step. Alternatively, the kd-server may use a counter log that counts the number of requests and terminates when the expected number of requests has been reached.

Trusting the App Binary

Step 18 sends the app binary 56 and any dependent libraries to the app-client. These are not at rest on the external system and so are not subject to a tampering threat. Therefore checksum verification is not needed. The binaries are transferred from the kd-server as a buffer that needs to be loaded into memory as an executable object. There are established techniques for loading executable objects at run-time from a file system. Whilst writing the binaries to the file system can be protected by Unix privileges and the files can be deleted once they have been loaded, there is a small window of vulnerability where an attacker with elevated privileges could make a copy of the binaries.

The app launcher may use diskless technology to protect the app binary 56. For example, version 3.17 of the Linux kernel introduced the memfd_create function, which allows creation of an anonymous file and returns a file descriptor that refers to it. The file behaves like a regular file, and so can be modified, truncated, memory-mapped, and so on. However, unlike a regular file, it lives in RAM and has a volatile backing storage. Once all references to the file are dropped, it is automatically released. Additionally, once data has been written to the memory it can be sealed so that further updates to the data are prevented.

The app launcher may, alternatively, use Intel SGX technology to create a secure enclave on each node of the execution system and run the app from within the enclave.

The trust model, alternatively, may choose to have the app binary 56 and libraries at rest on the external system and perform check-sum verifications using the verification library.

Step 18 is complete when the application is running.

Securing the Data Encryption Key

Step 19 consists of the application securely obtaining the encryption key so that it can decrypt the input data files. The app launcher 58 obtained the encryption key in step 17. The key could have been passed to the app when it launched but this would have meant the app holding the key for the duration of the run which may be some days or weeks. The trust model leaves control of the key in the hands of the app launcher. This means that technology that would have significant run-time impacts on the solver, such as obfuscation, can be used to protect the key in the app-launcher.

FIG. 8 shows the call back functionality used to effect this approach. The call-back requires a routine that can be called by the app. This sits within the verification library or a separate key access library. Both would have small memory footprints and are only moderately affected by obfuscation. Every time the application wants the key, it makes a call to the call-back function which provides the key in locked memory. Once the operation needing the key has been completed, the key is securely deleted from the app's memory. Since the key is passed as a pointer to a memory location. The responsibility for secure memory deletion rests with the app launcher and not the app.

FIG. 9 shows the same call back functionality but with the dependent libraries built as part of the app launcher. This may be desirable for system libraries that can be linked statically with the app launcher rather than linked dynamically with the app binary. A hybrid of FIGS. 8 and 9 may be implemented to ensure sensitive libraries are not at rest on the external system but 'standard' system libraries are linked statically with the app launcher 58.

Step 19 is repeated at discrete intervals when the job is running when encrypted data is being read or written to input and output files respectively. Typically these operations constitute of the order of 1% of the total run-time. Even if the overhead of accessing the key by a call to an obfuscated call-back routine is high, the impact on total run time remains small.

Once the job has completed and written its final output the app and app-launcher terminate. Before terminating the app launcher sends a kill signal to the kd-server if this was not already done in step 17. This completes step 20 and the end-to-end process.

Trusting the External User Account

Figure 10:
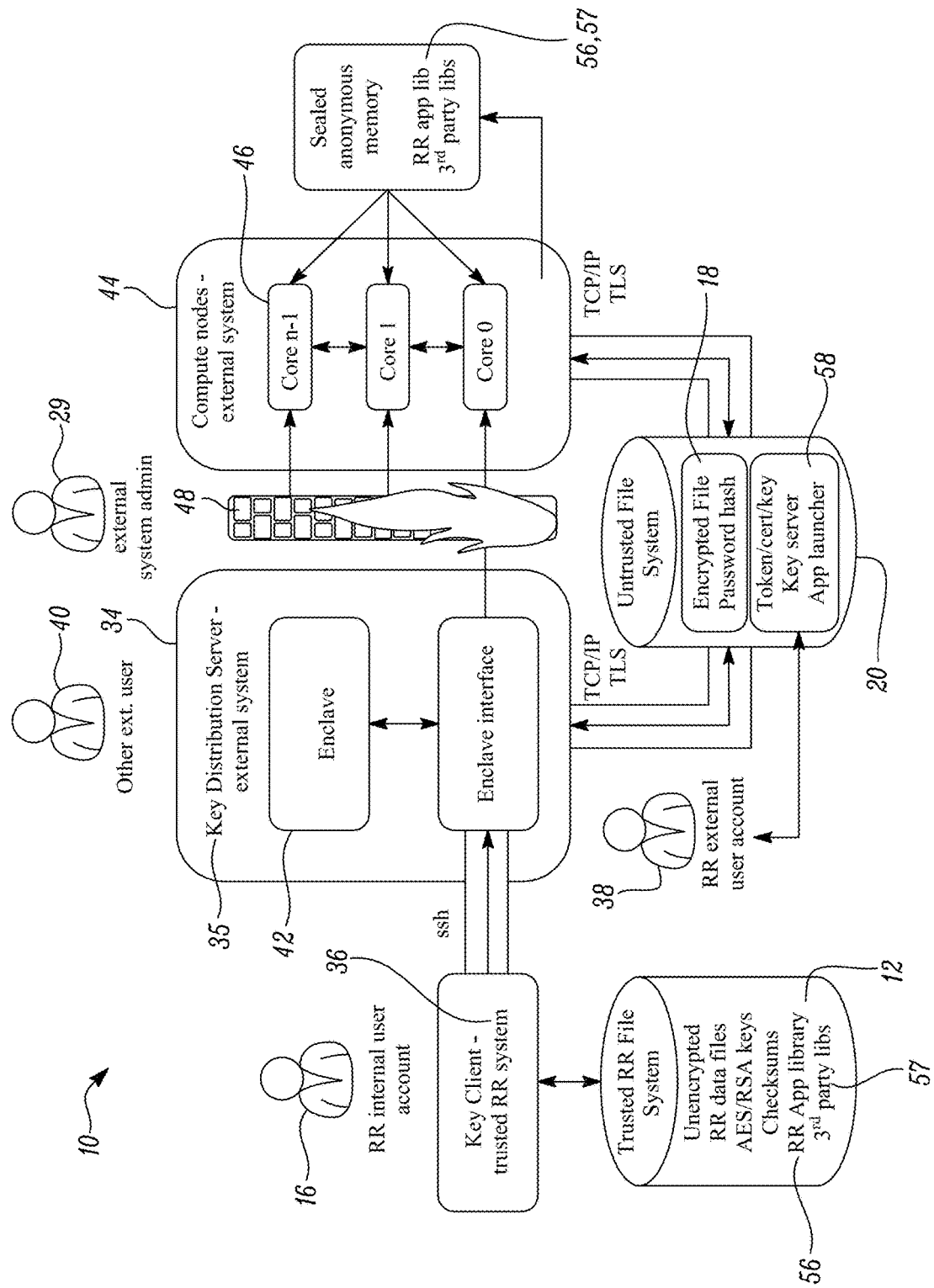
FIG. 10 is a schematic of the final trust position for running a computational job on the shared resource.

FIG. 10 shows the final trust position and can be compared with FIGS. 3 and 7. Since the external system is unlikely to be integrated with the organisation's access database such as Active Directory, the trusted user is likely to have an independent account on the external system.

The registration phase of the trust model (steps 1-13) is completely controlled from the trusted system over a secure connection. Trust in the external account is, therefore, based on the ssh protocols. At run-time, trust in the external user account 38 is based on the token that has been stored. This has the same degree of protection as the public-private key pair used by ssh. This does rely on (Unix) permissions and neither the kd-server or app launcher will proceed if the file and the directory it is in have the incorrect permissions. This means the model is not reliant on users following a designated security policy on the system.

There are two types of attack based on elevated privileges. The first is a normal user seeking to elevate their privileges. Such attempts are monitored by the external system and users have their accounts automatically locked after a small number of attempts. The second is a rogue administrator who can impersonate the trusted user's account. Such an administrator effectively becomes the user and can do everything the user can. However, all the user can do is run jobs and generate encrypted output. Hence, a rogue administrator can perform denial of service attacks such as terminating the kd-server before the job begins to run; or, submit jobs that use up a resource allocation. Since access to the data encryption key is protected, the rogue admin had no means of decrypting the output files.

Longevity of the Kd-Server

Just as a rogue admin can perform a denial of service by killing the kd-server, it may also be subject to legitimate termination such as a reboot of the staging system. The trust model does allow for this scenario as the registration phase (steps 1-13) can be re-run while the job is queuing. The kd-server must be started on the same host IP address and port. Repeating steps 1-13 creates a new token in the run-time directory. This should be done with care as the job will fail if it starts while a new registration phase is in progress.

Part of the trust model is that the kd-server instance and token are atomic—they are valid for one user and one job. Users cannot share kd-servers or tokens. A given user may use the same kd-server for multiple jobs, but each job has its own token. The server may log the token usage and terminate itself once the last token has been consumed.

Trusting the Execution Environment

FIG. 10 shows the relationship between the execution environment 44 (comprising a plurality of cores 46, i.e. compute nodes) and the front end (comprising key distribution server 35) of the external system. This shows a firewall 48 between the front-end 34 and the compute nodes 46. This can more-generally be defined as a plurality of policies that are in place on the external system, e.g. such as any or any combination of:

The compute nodes communicate with each other but are blocked from communicating with the front-end node.

Users 38, 40 cannot directly log on to the compute nodes

Once a job launches, the node(s) 46 on which it runs cannot be used for another job until the running job has completed. (Note this is not true of cloud environments where over-loading of nodes is a common practice. The model for untrusted system administrators described above addresses this.)

The policies 48 are trusted to prevent other users being able to access run-time data on the compute nodes 46. The system administrator accounts 29 still pose a denial of service risk.

The overall threat management provisions may include vetting of the system administrators and may apply limits to what functionality they can use via remote access, e.g. to counter coercion. Unlike cloud platforms, the large national supercomputers, which are a key focus, are in fixed locations and typically in jurisdictions where hiring and clearance policies are well-defined and consistently applied. Hence, for at least some external systems trusting the administrator accounts is justified by the policies that are in place.

The policies to access the compute nodes 46, indicated by the solid firewall 48, are now fully trusted. This means there exists trust in the execution environment 44 and steps 14-20 in the sequence of operations described above can be fulfilled.

Figure 11:
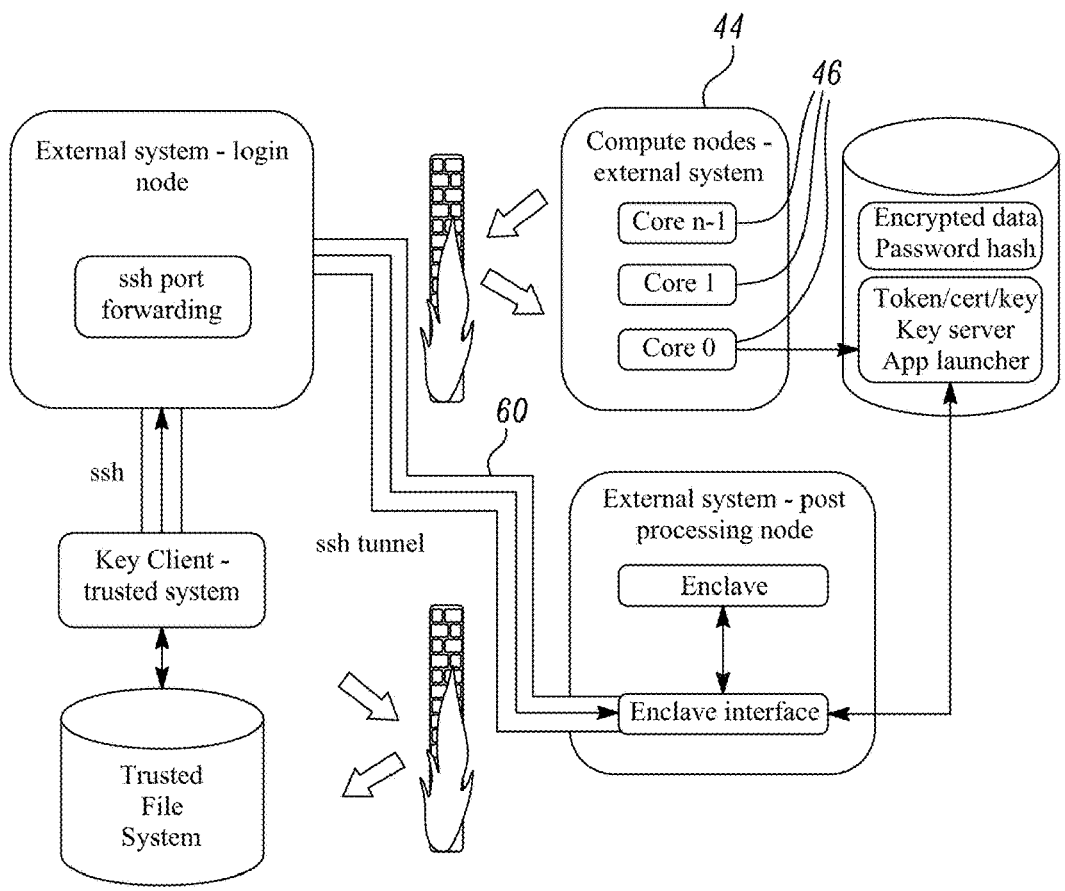
FIG. 11 shows the operation of the trust model when a direct connection between the compute nodes and front end is in place.

The lack of access from the compute nodes to external certificate servers and its impact on the trust model has been described. FIG. 11 shows the situation where the compute nodes have no access to the front end and, hence, the kd-server. This is resolved by using established port forwarding techniques to access a different system to act as the staging system. This may be pre or post processing nodes, e.g. that are common on HPC installations. It may also be a dedicated security server than has Intel SGX technology. This is an attractive scenario for systems that do not have SGX technology and are some years from being refreshed.

Obfuscation

Figure 12:
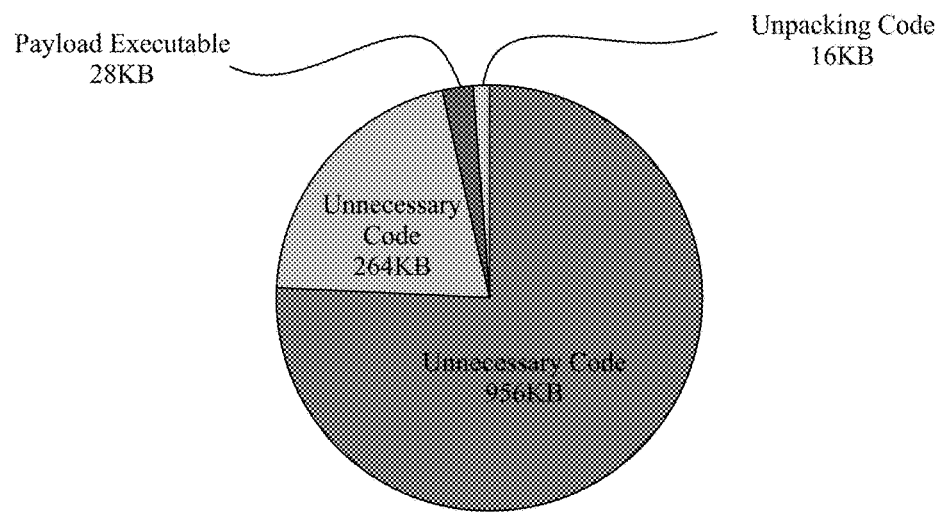
FIG. 12 shows an example of code and data makeup for obfuscation.

Obfuscation has been mentioned previously as means of protecting applications at rest on external systems. Attackers often use obfuscation to make it harder to develop counter measures. FIG. 12 shows an example a breakdown of the code footprint that could be implemented using obfuscation. In various examples the unnecessary code and/or data would comprise a majority of the overall size, e.g. greater than 70%, 80%, 90% or 95% of its size. The executable in this example constitutes just 2% of the binary and the remainder is unnecessary code and data.

The unnecessary code introduced by obfuscation can have an impact on run-time performance but the application is now protected using ephemeral storage and core dump prevention. The only software at rest on the external system is the kd-server app launcher 58 which contain no sensitive intellectual property. The app launcher does have to interface with the crypto libraries which means it holds the data encryption key. Since the data key is only needed at discrete points when reading and writing data, the app launcher is also not performance sensitive. Hence obfuscation allows the app launcher to be secured without affecting run-time performance of the solver. Similarly, the parts of the kd-server than provide the interface to the secure enclave are not performance sensitive and can be obfuscated.

Final Trust Position

The final trust position when the sys admins are trusted is shown in FIG. 10. Items at rest on the external system are:
The, e.g. AES, encrypted data files 18,
The hashed password for the kd-client to make an initial connection to the kd-server,
The kd-server,
The app launcher 58,
The user's private token or private key/certificate.

Of these, only the last one relies on trusting the system admins and hence Unix file permissions. By definition the data files are protected by encryption; and, the kd-client and app launcher 58 are protected by obfuscation. All other sensitive data is held in either an SGX enclave or sealed anonymous memory. Data in transit is protected by ephemeral session keys and core dumps are prevented by the app launcher.

A large portion of the trust model uses ephemeral session keys and ephemeral storage that cannot be dumped to disk. This is secure against both administrators and non-administrators. This protects the data encryption key and so the encrypted data is also secure against administrator attacks. The obfuscation protection of the app launcher 58 also protects equally against admin and non-admin attacks. The only difference is that an administrator does not have to break the Unix file permissions to obtain the kd-server or app launcher code.

The only remaining vulnerability for admin attacks (i.e. non-trusted administrators) is the user's private token/key/certificate.

When considering data protection and the distinction between administrators and users, all the user does on the external system is launch jobs to the queue which run the app launcher 58. The running job is secured using ephemeral storage and the job output is encrypted. The call-back programming model allows different keys to be used for input and output and even for different arrays within the same file. This is recommended practice as the input key is only needed at start-up and can be discarded thereafter. The output key is needed whenever output is written which is several times during a run. The structure of the output files is that they are useless without the input files.

Additionally, there is some protection from the transitory nature of the enclave. This has greater longevity than the ephemeral keys and storage as the enclave must persist from the time the computational job is submitted to the queue to the time it completes. There is some resilience as the kd-server can be restarted before the job starts as long as the job does not start while the kd-server is being restarted. The queue does provide a side-channel by which the system administrator can tell when a job is submitted to the queue; they can also look for the key distribution process running on the front-end. A spoof app launcher will fail the checksum tests. Hence, all a rogue administrator can do is run the application launcher and generate encrypted output for which he/she does not have the decryption key. Thus no sensitive data is obtained and no additional functionality is made available to the attacker. An attack of this kind effectively becomes a denial of service attack as it takes up positions in the queue and consumes machine allocations. The key distribution server counts the number of client requests and can detect when more jobs than expected are requesting keys.

In summary, an untrusted system administrator can launch denial of service type attacks but cannot obtain any sensitive information. Thus the above-described system provides a robust model for executing jobs on shared resources safely, protecting against both rogue users and administrators, even when an undetermined wait time is incurred between submitting the job to a queue and starting the job.

Summary

Figure 13:
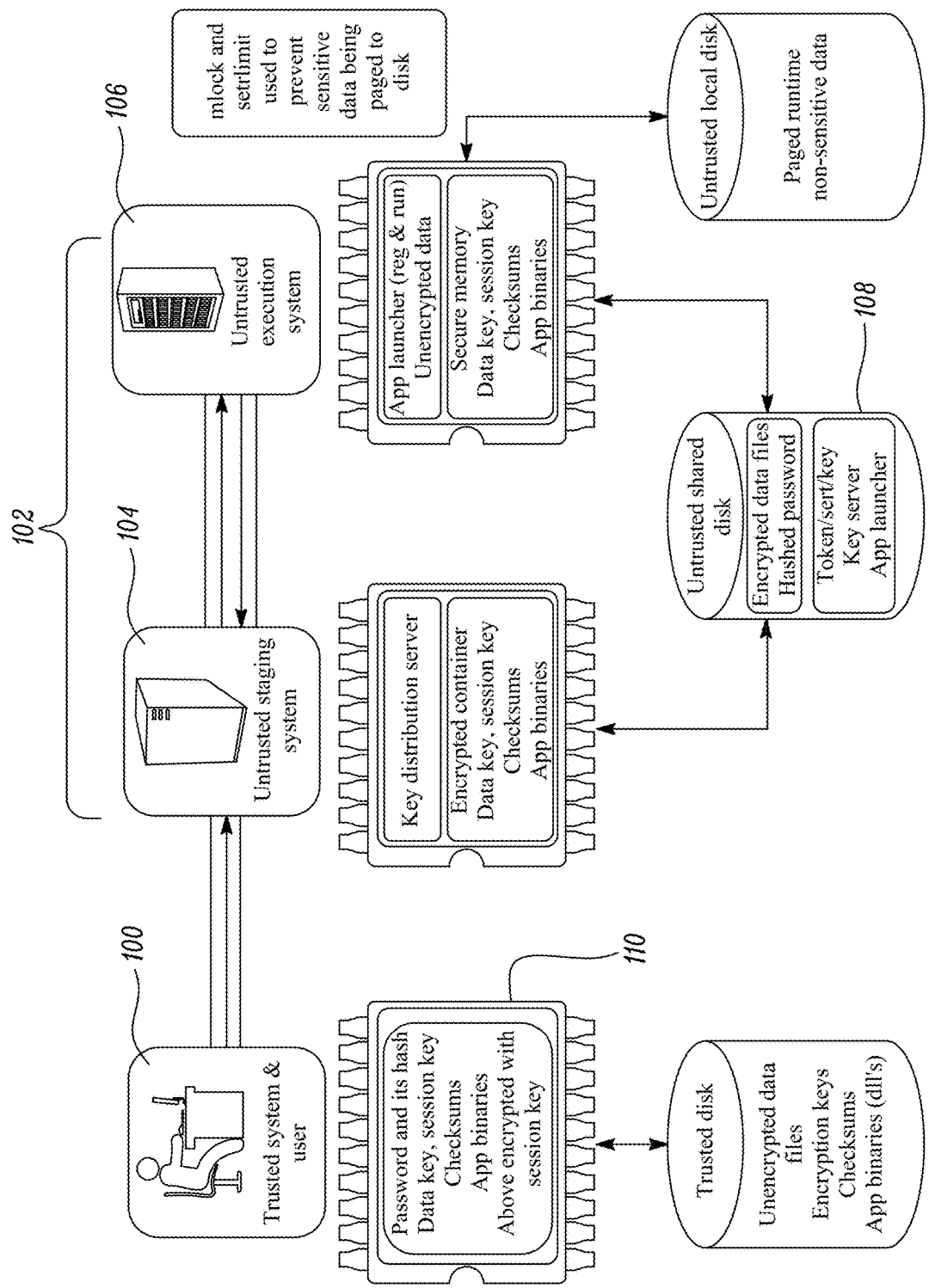
FIG. 13 shows a schematic of the security system in use.

In FIG. 13, an overview of the system is provided to describe the system in a general sense in use. The system allows a trusted system 100 and user to implement computational jobs on an untrusted/shared facility 102 having an untrusted front end, i.e. staging area/system 104 and an untrusted execution system 106. The trusted system 100 is typically provided behind a firewall, i.e. providing the route of trust. The execution system 106 may only be connected to the staging system 104, e.g. having no wider network/internet connection.

FIG. 13 shows the different components of the system provided on the different trusted/untrusted system hardware. In addition to the simple trusted/untrusted status, it can be seen that the key pairs and application launcher stored on hard disk 108 at the shared facility 102 have a different status in that they are generally trusted but subject to trust in the system administrators. That is to say, they are vulnerable to a compromised system admin.

During a setup phase, the volatile computer memory 110 of the trusted system 100 handles the data and session keys, the password and its hash, checksum data and the app binaries. During job submission, the untrusted staging system 104 memory handles the hashed password in the open and the data and session keys, the checksums and application binaries in the encrypted container.

There may be an undetermined delay between job submission and execution. At run time, the memory of the untrusted execution system 106 runs the app launcher and associated unencrypted data and maintains in secure memory the data and session keys, checksum data and the application binaries. The data on the hard disk of the untrusted system 102 is encrypted and decrypted on the file. Data in the memory of the execution system 106 may comprise unencrypted sensitive and non-sensitive data. However specific steps as described herein are taken to prevent sensitive data being paged to disk. Also, the unencrypted data as a whole is distributed across processes within a node and/or across multiple nodes, i.e. across multiple cores.

Practical Considerations

There is a practicality that some systems do not allow the compute nodes to launch connections to the front end 34. Whilst this does not significantly affect the fundamental trust model position of FIG. 10, an example solution to this scenario is shown in FIG. 11, which involves using a tunnel 60, e.g. an SSH tunnel when compute nodes 46 cannot connect to the front-end 34.

There are some further practical considerations as one the reasons for running on external platforms is to access many thousands, e.g. tens and even hundreds of thousands, of cores 46. This, in itself, gives some security through obscurity as no one core 46 holds a substantial portion of the sensitive data. However, a concern is overloading the key distribution server 35 with so many cores 46 requesting the data key and the dynamic libraries at the same time.

If every core 46 launches its own copy of the app launcher 58, one solution is for the rank 0 launcher to handle all the traffic with the key distribution server 35 and share the data key and the dynamic libraries with the other ranks, e.g. using Message Passing Interface (MPI) standard. MPI messages are conventionally sent in the clear, but the messages are just bit patterns and so encrypting the messages is feasible.

Where the sys admins are trusted, other measures mean sending the keys etc. in clear MPI messages is secure. When the sys admins are not trusted, the MPI messages can be encrypted using session keys. The rank 0 core 46 needs to establish session keys between itself and all the other cores. This is no greater an overhead than each core generating session keys to connect to the key distribution server 35.

However there is a specific issue in generating session keys on the compute nodes. Cryptographically secure random numbers need an entropy pool in order to seed the random number generator. To meet cryptographic requirements the entropy pool should be fed with hardware generated noise, typically, derived from input devices and device drivers. These create a phenomenon called jitter where there is variability in the time a run takes due to intermittent system load. The stack on the compute nodes is designed to reduce jitter to as close to zero as possible. This means there is hardly any hardware generated entropy.

A potential solution is to use the Intel hardware random number generator. In the case of keys being distributed by the rank 0 process, the requirement for cryptographically secure random numbers may be unnecessary and the software generated entropy pool could be used since only the compute nodes 46 share the session keys.

Another practical consideration concerns the other libraries on which the application is built. The most significant of these is the crypto library and this is used to illustrate the treatment of other libraries. In order to keep a clear separation between the core code and the source code of the other libraries, such as the crypto libraries, it is possible to use dynamic/shared object libraries for the latter. This means that the core code binaries 56 never contain any code of the other libraries.

The trust model described herein has been developed with supercomputers in mind which have fixed installations. However the trust model is considered to be suitable for cloud applications. Additional considerations are:

Secure deletion of files after a run as completed. Although all residual files are encrypted control of where the files are stored may be lost.

The compute infrastructure is not as ring-fenced as the compute codes on a supercomputer. This means MPI messages sending keys between nodes cannot be sent in the clear. The plus side is that cloud compute nodes are likely to have a lot of entropy for generating random session keys.

Some examples of the system described herein assume a front-end with SGX enabled but makes no assumptions about the availability of SGX on the compute nodes. This is because updating the front-end or adding a single security node is much less daunting that upgrading an entire set of compute nodes. The main focus herein is the Linux OS as this is the predominant HPC OS.

With access to international supercomputers also being attractive and the trend towards HPC in the public cloud, the scenario where admins aren't trusted is highly relevant. The stringent model described herein can be adopted for such scenarios.

In summary, there has been developed a trust model/system that is secure against non-admin attacks and will prevent access to both the data and the solver. Given that a rogue admin can impersonate any user (e.g. by typing su—user) there is little that can be done to prevent them doing what a genuine user can. Therefore, the model for rogue admins is not to defeat them but to ensure any output they generate cannot be decrypted. Using this model, rogue admins cannot compromise the integrity of the data or solver.

The trust model utilises modern hardware security capabilities in Intel chips and recent additions to the Linux kernel that enable sealed anonymous memory. This means proprietary codes do not have to be stored at rest on the external system. The use of ephemeral storage and session keys is also believed to provide an end-to-end encryption model that can meet certain export control requirements if jobs are to be sent to different countries.

By removing the need to trust system admins, this trust model may have broader application than national supercomputers and may be relevant to wider computing resources and cloud computing.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of performing computational jobs securely on a shared computing resource, comprising:
    encrypting data files for a computational job on a secure system and storing the encrypted data files in a data store on the shared computing resource;
    establishing a key distribution server using a secure enclave on a front end of the shared computing resource;
    transferring cryptographic keys and application binaries to the secure enclave of the shared computing resource using a session key;
    running the computational job via an application launcher on compute nodes of an untrusted execution environment of the shared computing resource, said application launcher obtaining the application binaries for the computational job and the cryptographic keys for decrypting the encrypted data files from the key distribution server.

2. The method of claim 1, wherein the application binaries are obtained at a launch-time of the computational job and are not stored in a non-volatile data store of the shared computing resource.

3. The method of claim 1, wherein a data file cryptographic key is transferred between the front end and the untrusted execution environment of the shared computing resource at launch-time of the computational job via the application launcher whose authenticity is verified without reference to a certificating authority.

4. The method of claim 1, comprising holding the obtained cryptographic keys in a secure memory of the application launcher, which is accessed via a call back routine.

5. The method of claim 1, wherein multiple session keys are used for transfer of data files, application binaries and/or data cryptographic keys to the shared computing resource and/or execution environment thereof.

6. The method of claim 1, wherein the application binaries are loaded into anonymous RAM in the untrusted execution environment.

7. The method of claim 1, wherein there is a time delay of hours, days or weeks between storing the encrypted data files in the data store on the shared computing resource and running the computational job on the shared computing resource.

8. The method of claim 7, wherein the key distribution server is maintained on the front end of the shared computing resource during said time delay and/or wherein the application launcher is at rest on a non-volatile data store of the shared computing resource.

9. The method of claim 1, wherein the application launcher comprises a key client and/or key call back routine/module.

10. The method of claim 1, wherein the application binaries and/or the application launcher are protected by obfuscation.

11. The method of claim 1, wherein verification of the application binaries is performed at a launch-time of the computational job by attestation and/or checksum verification.

12. The method of claim 1, wherein each compute node comprises a key client and implements a key call back routine.

13. The method of claim 1, wherein a first compute node of the untrusted execution environment communicates with the key distribution server and the session key is exchanged between the first compute node and a plurality of other compute nodes of the untrusted execution environment at launch-time.

14. The method of claim 1, wherein the shared computing resource comprises a plurality of different sets of data files pertaining to different computational jobs that are queued for running on the shared computing resource, each of a plurality of computational jobs, including the computational job, being run sequentially upon the compute nodes becoming available after completing a previous computational job in the queue.

15. A data carrier or data storage medium comprising machine readable instructions for one or more processor of an execution environment of a shared computational system to operate as an application launcher for a computational job run using the method of claim 1, wherein the application launcher (i) comprises a key client for communication with the key distribution server on the front end of the shared computational system and (ii) obtains the application binaries at the launch-time for performing the computational job.

16. The method of claim 1, further comprising
registering the application launcher using the key distribution server when the application launcher is launched.

17. A shared computational system arranged to perform computational jobs instigated by a trusted system, the shared computational system comprising:
a non-volatile data store arranged to store encrypted data files for a planned computational job;
a key distribution server on a front end of the shared computational system having a secure enclave;
an execution environment comprising multiple compute nodes and a key client for communication with the key distribution server so as to enable decryption of the encrypted data files and application binaries at a launch-time for performing the planned computational job on the multiple compute nodes; and
an application launcher on compute nodes of a shared computing resource including the execution environment, said application launcher arranged to obtain the application binaries and the cryptographic keys from the key distribution server.

18. The shared computational system of claim 17, wherein the application binaries are obtained at a launch-time of the planned computational job and are not stored in a non-volatile data store of the shared computing resource.

19. The shared computational system of claim 17, wherein the key distribution server is maintained on the front end of the shared computing resource during a time delay between storing the encrypted data files in the non-volatile data store and running the planned computational job and/or wherein the application launcher is at rest on a non-volatile data store of the shared computing resource.

20. The shared computational system of claim 17, wherein the shared computing resource comprises a plurality of different sets of data files pertaining to different computational jobs that are queued for running on the shared computational resource, each of the computational jobs being run sequentially upon the compute nodes becoming available after completing a previous computational job in the queue.

* * * * *